United States Patent
Lefrancois et al.

(10) Patent No.: US 10,875,162 B2
(45) Date of Patent: Dec. 29, 2020

(54) PNEUMATIC TIGHTENING/UNTIGHTENING DEVICE WITH OPTIMIZED SETTING OF INTAKE

(71) Applicant: ETABLISSEMENTS GEORGES RENAULT, Saint Herblain (FR)

(72) Inventors: Benoit Lefrancois, Coueron (FR); Serge Besnier, Saint Herblain (FR)

(73) Assignee: ETABLISSEMENTS GEORGES RENAULT, Saint Herblain (FR)

( * ) Notice: Subject to any disclaimer, the term of this patent is extended or adjusted under 35 U.S.C. 154(b) by 81 days.

(21) Appl. No.: 16/233,735

(22) Filed: Dec. 27, 2018

(65) Prior Publication Data
US 2019/0202039 A1 Jul. 4, 2019

(30) Foreign Application Priority Data
Dec. 28, 2017 (FR) .................................... 17 63320

(51) Int. Cl.
*B25B 23/145* (2006.01)
*B23P 19/06* (2006.01)
*B25B 21/02* (2006.01)

(52) U.S. Cl.
CPC ........ *B25B 23/1453* (2013.01); *B23P 19/065* (2013.01); *B25B 21/02* (2013.01)

(58) Field of Classification Search
CPC ..... B25B 23/1453; B25B 21/02; B23P 19/065
USPC ........................................................ 173/1–2
See application file for complete search history.

(56) References Cited

U.S. PATENT DOCUMENTS

| 3,932,071 A * | 1/1976 | Schaedler ............. B24B 23/026 418/43 |
| 3,948,328 A * | 4/1976 | Hiraoka ............... B25B 23/1453 173/181 |
| 4,429,775 A * | 2/1984 | Teramoto .............. B23P 19/065 173/178 |
| 5,918,686 A | 7/1999 | Izumisawa |
| 7,228,607 B1 * | 6/2007 | Liu ........................ B21J 15/105 29/243.526 |
| 2005/0156008 A1 * | 7/2005 | Komazaki ............... B25C 1/043 227/10 |

(Continued)

FOREIGN PATENT DOCUMENTS

| DE | 3303715 U1 | 12/1993 |
| WO | 0154865 A2 | 8/2001 |

OTHER PUBLICATIONS

English translation of the French Written Opinion dated Sep. 25, 2018 for corresponding French Application No. 1763320, filed Dec. 28, 2017.

(Continued)

*Primary Examiner* — Robert F Long
(74) *Attorney, Agent, or Firm* — David D. Brush; Westman, Champlin & Koehler, P.A.

(57) ABSTRACT

A pneumatic screw driving device includes a terminal element intended to cooperate with an element to be tightened/untightened and a body. The body houses: a pneumatic motor capable of rotationally driving the terminal element; an air intake into the motor; and a setting element for setting an intake section of the air intake into the motor. The setting element can take at least: a fixed state in which the intake section is fixed; and a setting state in which the intake section is adjustable between at least two values.

15 Claims, 6 Drawing Sheets

(56) References Cited

U.S. PATENT DOCUMENTS

| | | | |
|---|---|---|---|
| 2007/0214781 A1* | 9/2007 | Lee | B25C 1/04 |
| | | | 60/413 |
| 2011/0180581 A1* | 7/2011 | Liang | B25C 1/047 |
| | | | 227/8 |
| 2013/0081838 A1 | 4/2013 | Tully | |
| 2014/0360744 A1 | 12/2014 | Lawrence | |
| 2016/0178084 A1* | 6/2016 | White | F04B 39/12 |
| | | | 137/553 |
| 2016/0332287 A1* | 11/2016 | Chen | B25B 21/00 |
| 2018/0185993 A1* | 7/2018 | Hita | B25B 21/002 |
| 2019/0100062 A1* | 4/2019 | Kuo | F16K 15/207 |

OTHER PUBLICATIONS

French Search Report dated Sep. 25, 2018 for corresponding French Application No. 1763320, filed Dec. 28, 2017.

* cited by examiner

PNEUMATIC TIGHTENING/UNTIGHTENING DEVICE WITH OPTIMIZED SETTING OF INTAKE

1. FIELD OF THE INVENTION

The field of the invention is that of the designing and manufacture of pneumatic tightening/untightening devices.

More specifically, the invention relates to the setting of the compressed air supply rate for such a device.

2. PRIOR ART

Pneumatic tightening/untightening (screwing/unscrewing) devices, especially impact wrenches, are commonly used in various fields essentially for unscrewing or loosening of nuts and screws without giving rise to any torque feedback in the operator's hands.

Such devices can also be used to tighten nuts and screws.

Impact wrenches are provided with means for setting or adjusting the compressed air supply rate for the motor to adjust their tightening capacity, as needed, in terms of torque values, each assembly being tightened to a given target torque value. Such setting means offer the operator possibilities of choice between several predetermined intake flow rate settings in the screwing or tightening sense, using a lever.

However, depending on the parameters of the place in which the impact spanners are implemented, the setting of the compressed air intake flow rate does not always make it possible to attain the planned tightening torque.

Indeed, depending on the type, volume, and setting of the pressure of the compressor, depending on the length and diameter of the tube connecting the compressor to the impact wrench, depending on whether the impact wrench is connected to this tube by means of a direct connector or a fast connector (reducing the section of passage of compressed air), and depending on the place in which the impact wrench is situated in the compressed air system relative to the compressor (the pressure of the supply of an impact wrench distant from the compressor will be smaller than that of a tool situated in proximity to the compressor), the tightening torque delivered by the impact wrench could be different from the tightening torque indicated by the manufacturer for this setting, depending on the available pressure.

However, certain assemblies need to be tightened to a precise predetermined target tightening torque.

Impact wrenches generally do not offer sufficient tightening precision so much so that the final tightening torque to which the assembly is tightened is often either too low or too high but rarely or even never equal to the target tightening torque.

Impact wrenches are therefore used for pre-tightening operations, the final tightening to the target torque being then carried out by means of a click wrench also called a torque wrench.

The greater the extent to which the setting chosen by the operator enables the pre-tightening to be done at a torque value distant from the target tightening torque, the greater the number of screw turns or nut turns that will subsequently have to be made with the torque wrench and, therefore, the lower will be the productivity.

If, on the contrary, the setting chosen by the operator is such that the pre-tightening torque exceeds the target torque, the assembly will be too tight, giving rise to:
   a deterioration of the screw threads which could prompt breakages of the assembly;
   the need to loosen and then re-tighten the assembly to the target torque by means of the torque wrench, thus lowering productivity.

Certain manufacturers are therefore increasing the number of setting positions for setting the predetermined intake flow rate to enable the operator to have a greater likelihood of finding the right section depending on his environment, i.e. depending on the environment that enables him to obtain a pre-tightening torque that is closest to the target torque without however surpassing it. This solution however requires the operator to constantly adjust the setting button without in any way being thereby sure of obtaining a precise pre-tightening torque value.

Another setting solution offers the operator the possibility of adjusting the intake flow rate more precisely by means of a knob wheel acting on the intake section.

The solution enables the operator to obtain, for a particular application, a pre-tightening torque that approaches the target tightening torque. However, if he wishes a momentary return to full power for another application, he will have to rotate the knob wheel to find the temporary position. This changes the setting corresponding to his particular application so much so that he will have to make a setting again when he has to carry out another tightening operation according to his particular application.

3. SUMMARY

An exemplary aspect of the present disclosure relates to a pneumatic tightening/untightening device comprising a terminal element intended to cooperate with an element to be tightening/untightening and a body housing:
   pneumatic motor means capable of rotationally driving said terminal element;
   means of air intake into said motor means;
   means for setting the intake section of said means of air intake into said motor means.

According to an exemplary embodiment of the invention, said setting means can take at least:
   a state called a fixed state in which said intake section is fixed;
   a state called a setting state in which said intake section is adjustable between at least two values.

The setting state enables the intake to be adjusted to obtain a precise level of torque for a particular application while the state known as the fixed state enables the selection of a predetermined intake level (for example 100% or 50% of the maximum intake).

The passage from a setting state dedicated to a given application to a state called fixed state, without disturbing the intake section of the setting state, momentarily enables the tightening power of the device to be modified in order to carry out any unspecified tightening and then to return to the setting state without needing to make a new setting, to obtain a tightening according to the particular application.

According to one possible variant, in each of said states called fixed states, said intake section ranges from 30% to 100% of the maximum intake section.

According to one possible variant, said setting means are configured to choose the value of said intake section, in said state called a setting state, amongst a plurality of predetermined values.

It is thus possible to achieve a fairly precise setting of the torque delivered by the device to adjust it for a particular application.

According to one possible variant, a device according to an exemplary embodiment of the invention comprises means for selecting the sense of rotation of said terminal element, said setting means being configured so that the value of said intake section is the maximum when the selected sense of rotation of said terminal element is the unscrewing sense.

Thus, in the unscrewing sense, the torque delivered by the device is always the maximum.

According to one possible variant, said setting means comprise a setting sliding gate that is mobile:
- along a first path to pass from one of said states to the other;
- along a second path to adjust the value of said intake section in said setting state.

In this case, said first path is preferably a rotation and said second path is preferably a translation, or said first path is preferably a translation and said second path is preferably a rotation.

According to one possible variant, said device comprises at least one air intake hole in said first motor means, said setting sliding gate being mounted so as to be mobile in rotation and in translation along an axis B and comprising an aperture that widens along the axis B and a notch with a constant section along the axis B, a shutter wall crossed by said aperture communicating with said notch, said setting sliding gate being capable of being moved in rotation to take at least:
- a first position to place said device in said fixed state, in which the intake hole communicates directly with the notch:
  partly in being partially shut by said shutter wall; or
  totally, in being totally open on said notch
- a second position to place said device in said state called a setting state, in which the intake hole communicates with the notch through the aperture:
  partly in being partially shut by the shutter wall, and
  adjustably, between at least two values, said setting sliding gate being capable of being moved in translation along the axis B to take at least two positions in which said at least one intake hole is more or less shut by said shutter wall.

This simple and efficient architecture provides a robust device.

According to one possible variant, a device according to an exemplary embodiment of the invention comprises means of selection of the sense of rotation of said terminal element, said means of selection comprising a selector that is mobile between:
- a position of rotation of said terminal element in the screwing sense in which said at least one intake hole co-operates with a first cavity leading into a first side of axis of rotation of said rotor to drive it in rotation in one sense;
- a position of rotation of said terminal element in the unscrewing sense in which said at least one intake hole cooperates with a second cavity leading into a second side of the rotation axis of the said rotor to lead it in rotation in another sense;

said notch of said setting sliding gate being laid out in order to totally open said at least one intake hole, whatever the state in which said setting sliding gate is situated, when said selector is situated in said position of rotation in the unscrewing sense.

According to one possible variant, a device according to an exemplary embodiment of the invention comprises a setting knob wheel for setting the value of said intake section in said state called a setting state, said knob wheel being mobile in rotation and linked to said setting sliding gate by a helical link capable of converting a movement of rotation of said knob wheel into a movement of translation of said setting sliding gate along the axis B.

Preferably, in this case, said knob wheel has a pinion gear cooperating with a toothed wheel that is mobile in rotation along an axis A parallel to said axis B and fixedly attached to a cam extending helically way about said axis A, said cam cooperating with a groove made on the periphery of said control valve.

This makes it possible to carry out a simple and efficient setting of the position of the control valve.

In one possible variant, said knob wheel has a plurality of indexed positions, each corresponding to a predetermined intake section value. An operator can thus refine the value of the torque delivered by the device in choosing from among a plurality of preset values In this case, said toothed wheel preferably has a marking indicating the intake section values for each of the positions indexed.

According to one possible variant, said markings are visible through a window passing through a hood disposed in the rear of said tightening/untightening device.

This enables the operator to know the setting of the device that he is using.

According to one possible variant, a device according to an exemplary embodiment of the invention comprises a driving lever for driving said setting sliding gate in rotation along the axis B from one of its positions to the other, said lever being linked to said setting sliding gate by means of a sliding link along axis B.

According to one possible variant, said setting sliding gate is mounted so as to be mobile in rotation and in translation within said selector.

According to one possible variant, a device according to an exemplary embodiment of the invention possesses:
- a first state called a fixed state with total intake in which said intake section is maximal;
- a second state called a second fixed state with half intake in which said intake section represents 50% of the maximum intake section;
- a state called a setting state configured to enable an incremental modification of said intake section between values ranging from 5% to 45% of the maximum permissible section.

4. LIST OF FIGURES

Other features and advantages shall appear from the following description of particular embodiments, given by way of simple, illustratory and non-exhaustive examples, and from the appended drawings of which:

5. DESCRIPTION OF PARTICULAR EMBODIMENTS

Referring now to FIGS. 1 to 10, an example is presented of a pneumatic screwing-unscrewing device according to an exemplary embodiment of the invention. In this case, it is an impact wrench. It could be a classic screwing-unscrewing device.

Figure 1:
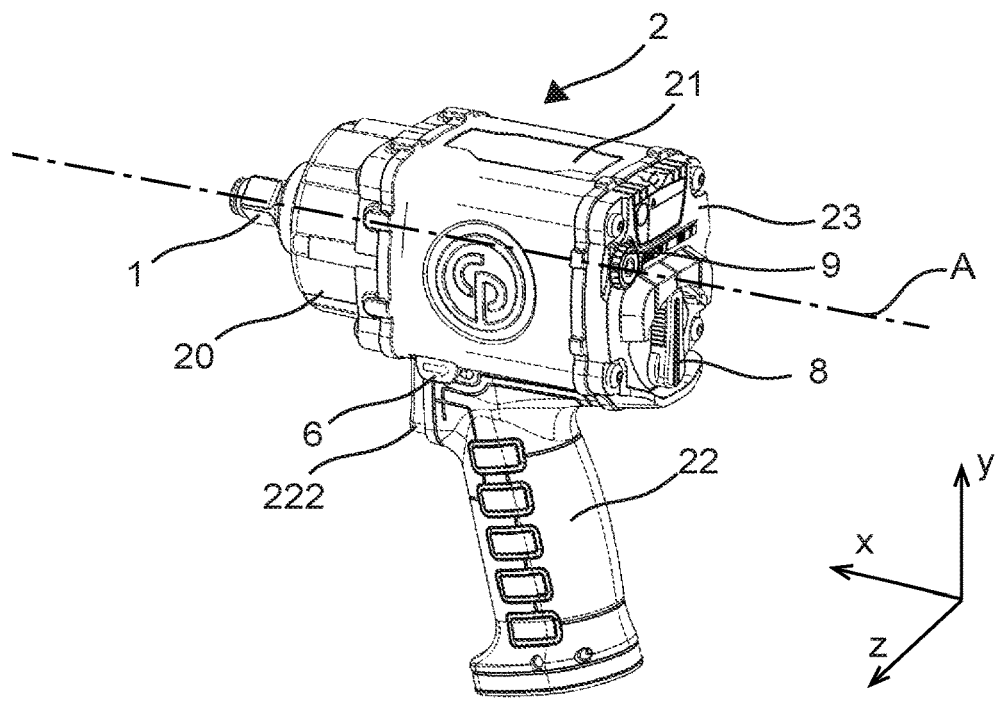
FIG. 1 is a three-quarter view or view in perspective of a device according to an exemplary embodiment of the invention.
Figure 2:
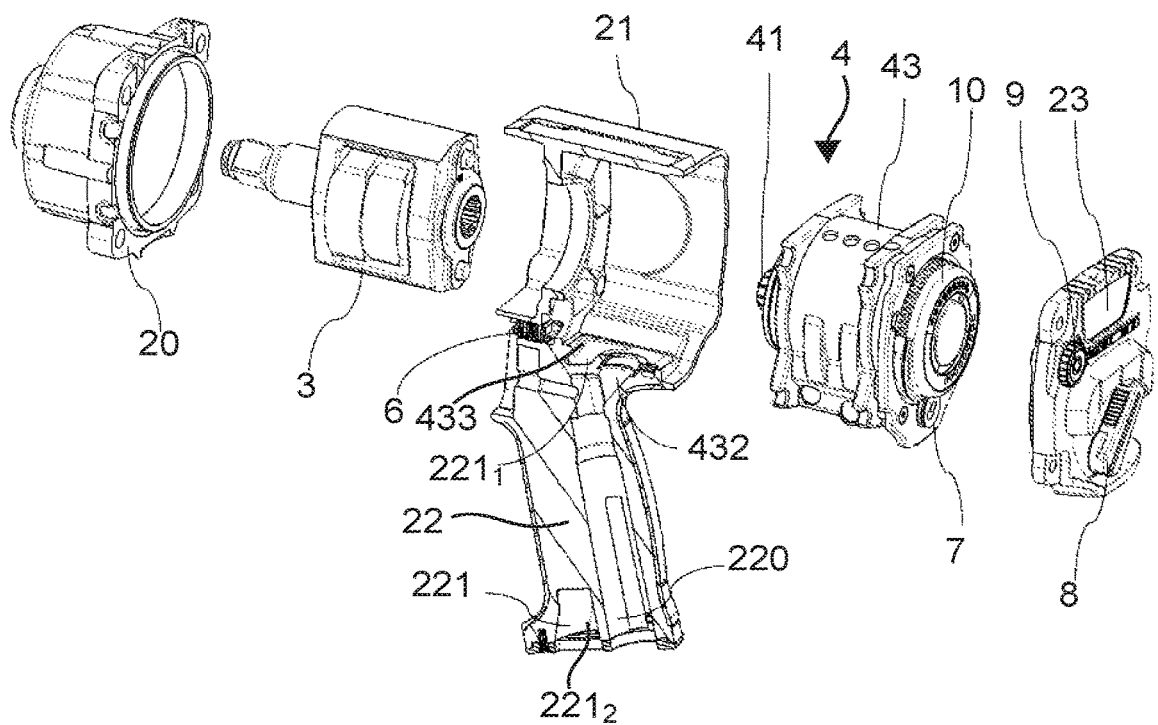
FIG. 2 is an exploded view of the device of FIG. 1.
Figure 3:
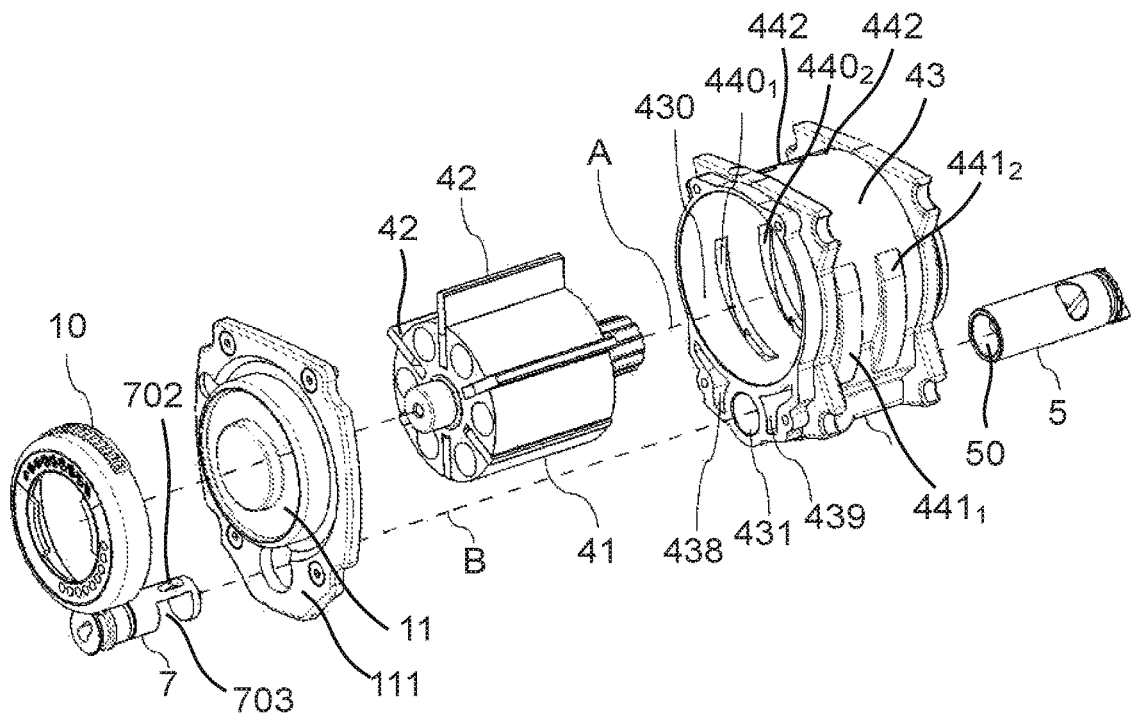
FIG. 3 is an exploded view of the motor of the device of FIG. 2 and of the intake-setting.
Figure 4:
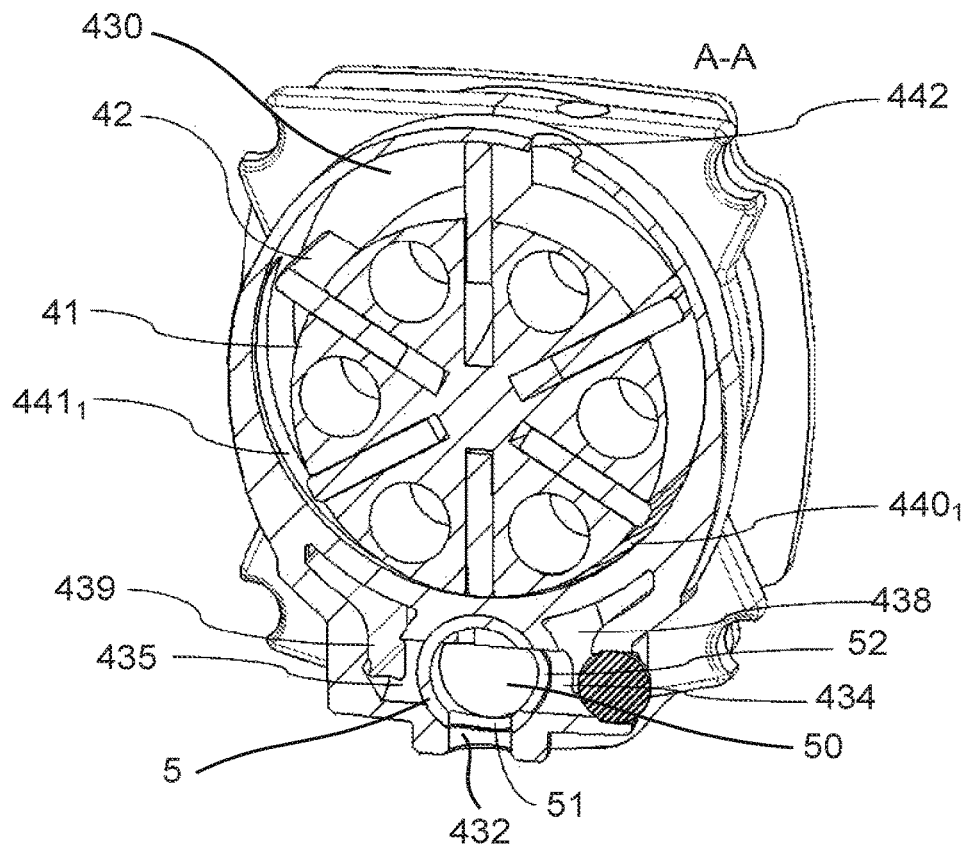
FIG. 4 is a view in section taken at the intake of the device of FIG. 1 along a plane crosswise to this FIG. 1.
Figure 5:
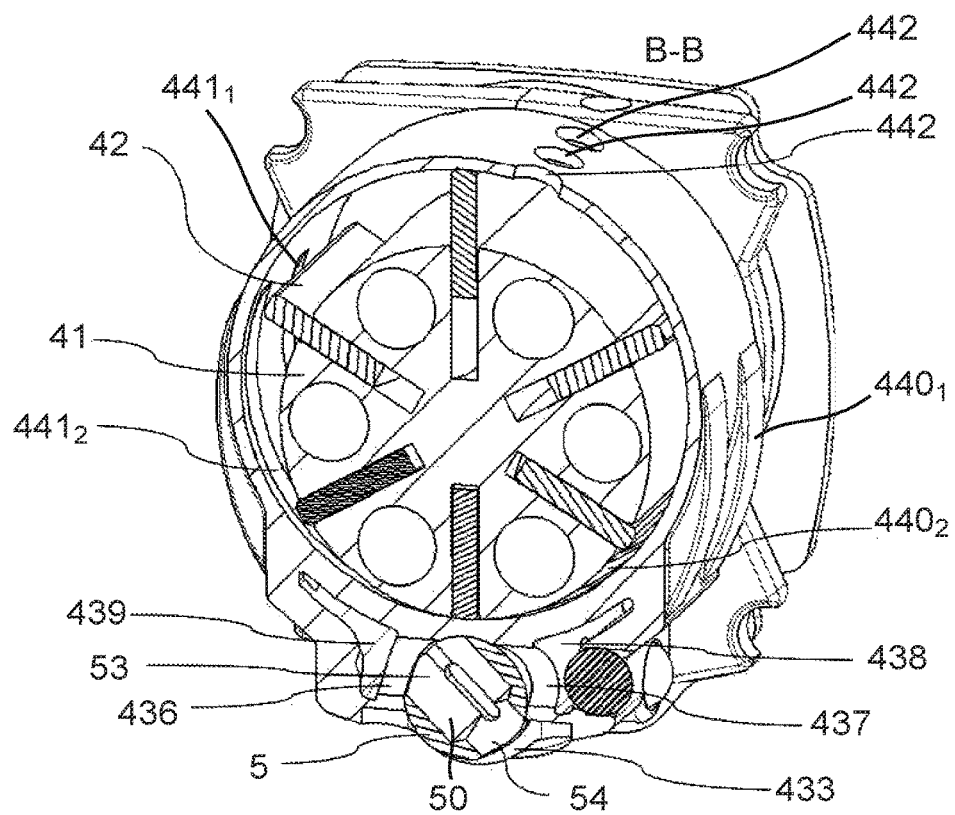
FIG. 5 illustrates a view in section taken at the exhaust of the device of FIG. 1 along the plane crosswise to this FIG. 1.
Figure 6:
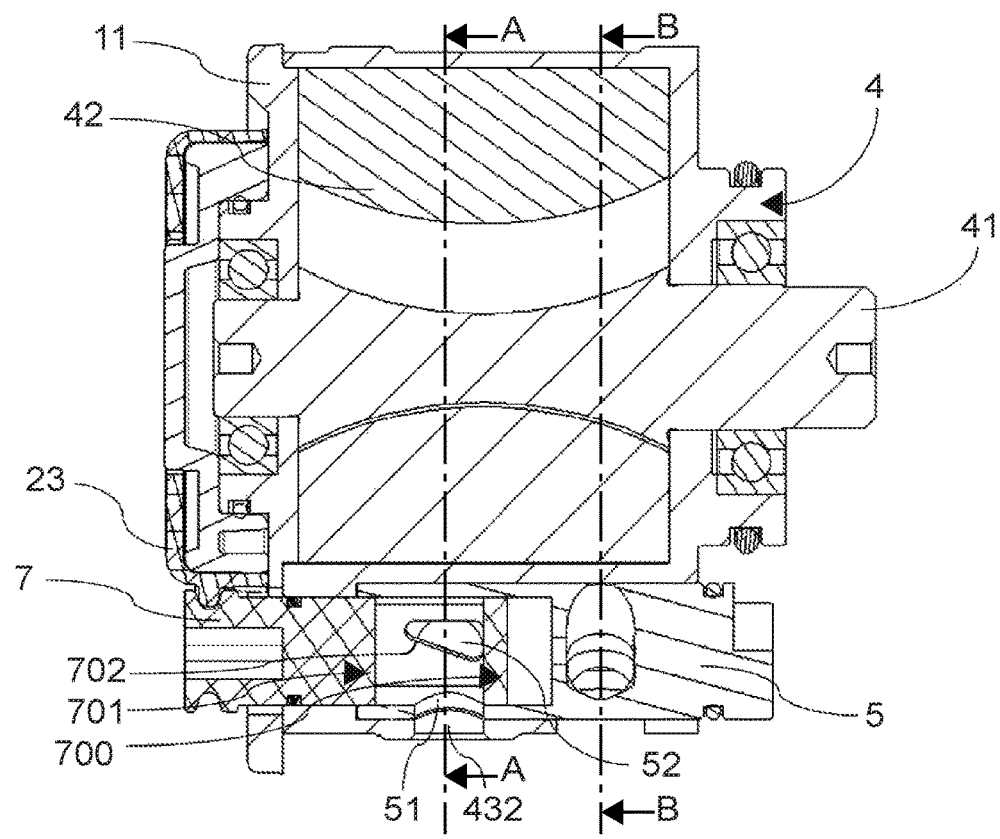
FIG. 6 illustrates a longitudinal view in section of the motor of the device of FIG. 1.
Figure 7:
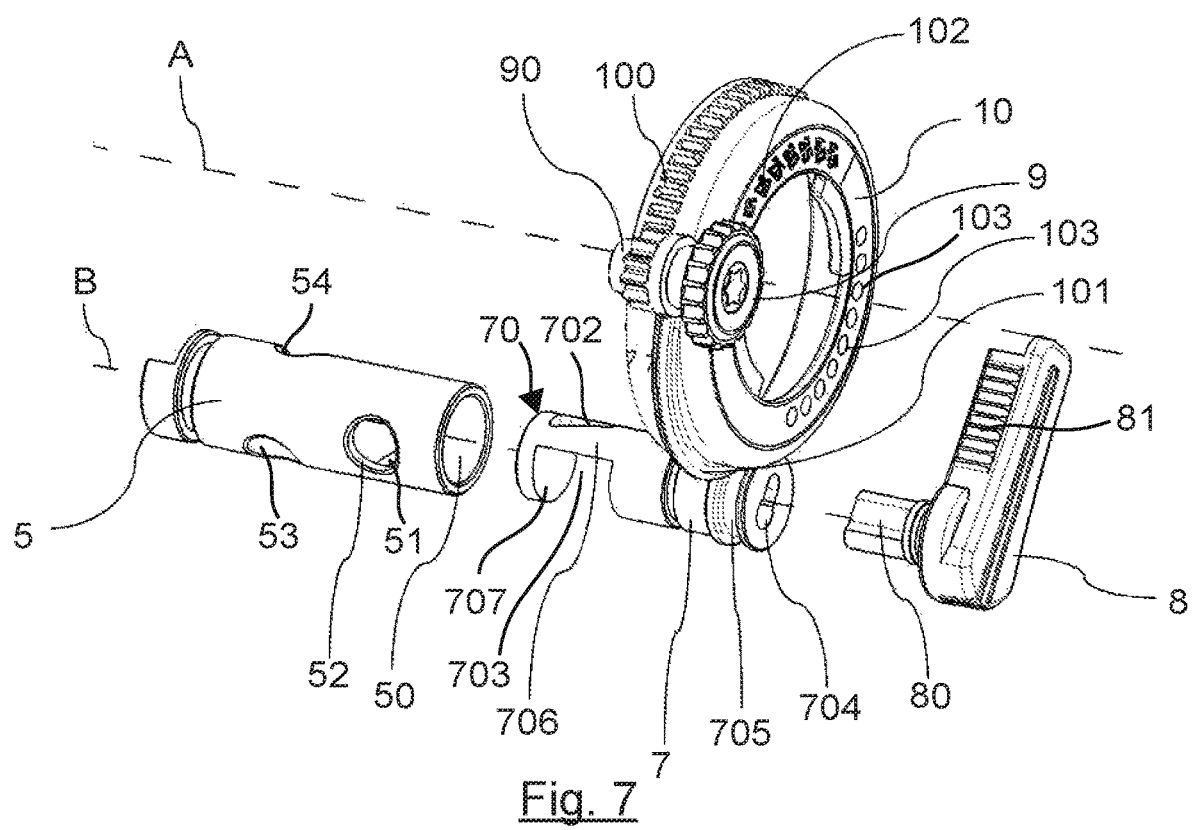
FIG. 7 is an exploded view of the intake setting element.
Figure 8:
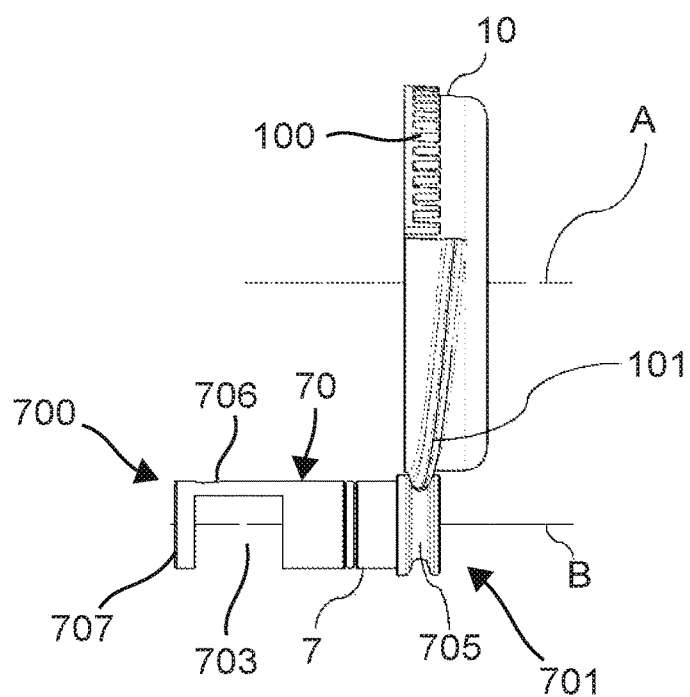
FIG. 8 illustrates the setting element used to set the control valve in translation.
Figure 9:
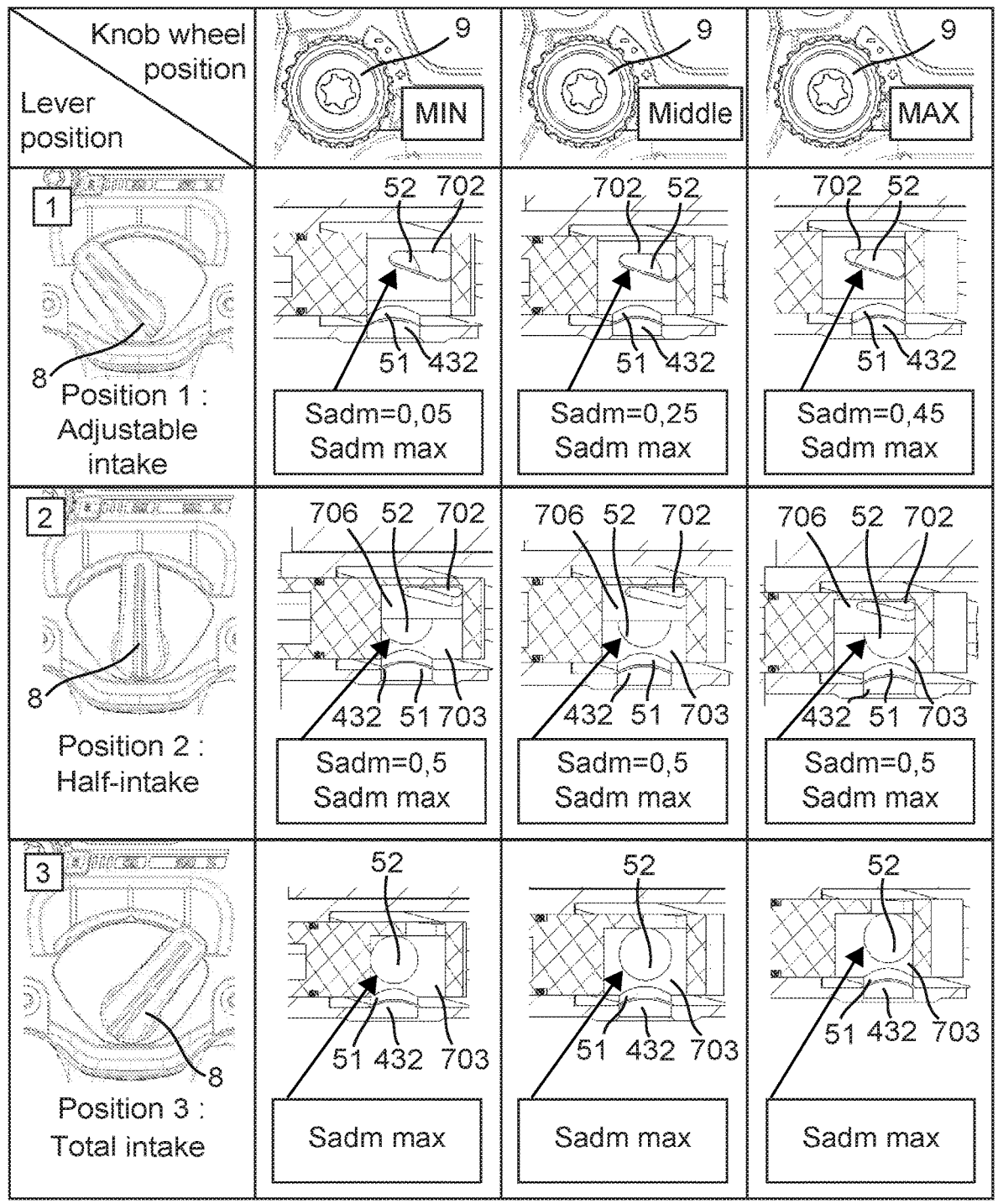
FIG. 9 is a table showing the different states of operation as a function of the positions of the knob wheel and the lever of a device according to an exemplary embodiment of the invention.
Figure 10:
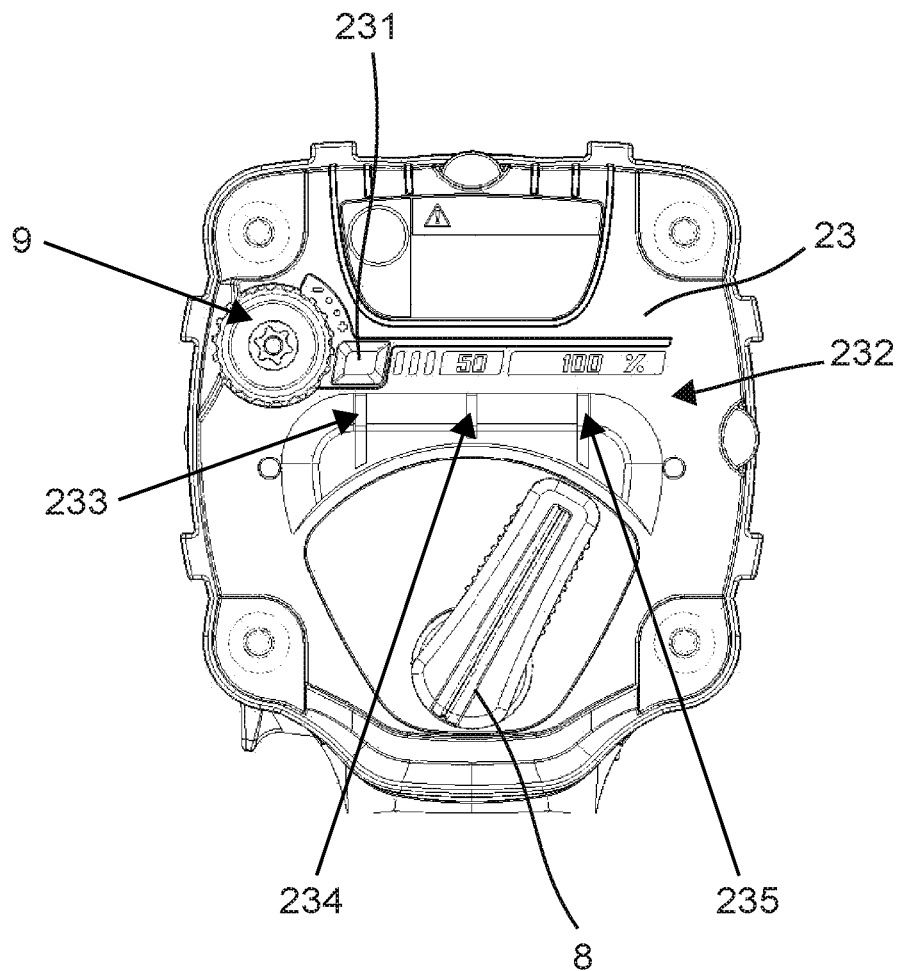
FIG. 10 is a rear view of the device according to an exemplary embodiment of the invention.

FIG. 1 illustrates a view in perspective of a screwing-unscrewing device according to an exemplary embodiment of the invention.

Such a screwing-unscrewing device comprises a terminal element 1 intended for cooperation with an element to be screwed/unscrewed placed at one extremity of a casing 2 that houses a pneumatic motor capable of rotationally driving the terminal element 1 in one sense or in another.

The casing 2 comprises a portion 20 housing a striker mechanism 3 and a portion 21 housing a pneumatic motor 4.

In this embodiment, the casing 2 is of a pistol grip type and comprises a grip 22.

The grip 22 is traversed by an air intake channel 220 and by an air exhaust channel 221 comprising an inlet $221_1$ and an outlet $221_2$.

The pneumatic motor 4 comprises a rotor 41 with blades 42 mounted so as to be rotationally mobile within the chamber 430 of a cylinder 43 along an axis B and rotationally linked to the inlet of the striker mechanism 3, the outlet of which is rotationally linked to the terminal unit 1.

The striker mechanism is known per se and is not described in greater detail.

The cylinder 43 comprises a central cavity 431 crossed by:
an intake hole 432 in communication with the air intake channel 220;
an exhaust hole 433 in communication with the inlet $221_1$ of the air exhaust channel;
an intake hole in the screwing sense 434;
an intake hole in the unscrewing sense 435;
an exhaust hole in the screwing sense 436;
an exhaust hole in the unscrewing sense 437.

The cylinder 43 comprises a first lateral cavity 438 and a second lateral cavity 439.

The interior wall of the chamber 430 is crossed by:
primary exhaust holes 442;
two intake and exhaust apertures $440_1$ and $440_2$ respectively in the screwing and the unscrewing senses;
two exhaust and intake apertures $441_1$ and $441_2$ respectively in the screwing sense and unscrewing senses.

The apertures $440_1$ and $440_2$ communicate with the lateral cavity 438. The apertures $441_1$ and $441_2$ communicate with the lateral cavity 439.

The central cavity 431 houses a selector 5 of the rotation sense.

The selector 5 takes the form of a control valve, the lateral wall of which demarcates a hollow interior space 50 and is crossed by a first intake hole 51 and a second intake hole 52 and by a first exhaust hole 53 and a second exhaust hole 54.

As shall be described in greater detail here below, a wall 707 separates the hollow interior space 50 into two spaces tightly sealed relative to each other, name:

a first hollow intake interior space $50_1$ into which there lead the first intake hole 51 and second intake hole 52, and a second hollow interior exhaust space $50_2$ into which there lead the first exhaust hole 53 and second exhaust hole 54.

This selector 5 is mounted so as to be rotationally mobile within the central cavity 431 in two positions, namely:
a position of rotation in the screwing sense wherein:
the first intake hole 51 communicates with the intake hole 432;
the second intake hole 52 communicates with the intake hole 434 in the screwing sense,
the first exhaust hole 53 communicates with the exhaust hole in the screwing sense 436;
the second exhaust hole 54 communicates with the exhaust hole 433;
a position of rotation in the unscrewing sense wherein:
the second intake hole 52 communicates with the intake hole 432;
the first intake hole 51 communicates with the intake hole 435 in the unscrewing sense 435,
the first exhaust hole 53 communicates with the exhaust hole 437 in the unscrewing sense;
the second exhaust hole 54 communicates with the exhaust hole 433.

The selector 5 is connected to an actuation button 6 placed at the level of the grip 22 which enables an operator to move the selector 5 from one of its positions to the other in order to choose the sense of rotation of the motor 4 depending on whether it is sought to carry out a screwing or an unscrewing operation.

When the selector 5 is placed in the screwing sense position and when the operator depresses the trigger 222, compressed air circulates in the air intake channel 220, passes through the intake hole 432, the first intake hole 51, the first hollow interior space $50_1$, the second intake hole 52, the intake hole 434 in the screwing sense, the first lateral cavity 438, the intake apertures $440_1$ and $440_2$ in the screwing sense, the chamber 430 within which it rotationally drives a rotor 41 in pushing against the blades 42, before escaping through:
the primary exhaust holes 442, and
the exhaust apertures in the screwing sense $441_1$ and $441_2$, the second lateral cavity 439, the exhaust hole in the screwing sense 436, the first exhaust hole 53, the second hollow interior space $50_2$;
the second exhaust hole 54, the exhaust hole 433, the inlet $221_1$ and then the outlet $221_2$ of the exhaust channel 221.

When the selector 5 is placed in position in the unscrewing sense and when the operator depresses the trigger 222, compressed circulates in the air intake channel 220, passes through the intake hole 432, the second intake hole 52, the first hollow interior space 50, the first intake hole 51, the intake hole 435 in the unscrewing sense, the second lateral cavity 439, the intake apertures $441_1$ and $441_2$ in the unscrewing sense, the chamber 430 within which it rotationally drives the rotor 41 in pushing against the blades 42, before escaping through:
the primary exhaust holes 442, and
the exhaust apertures $440_1$ and $440_2$ in the unscrewing sense, the first lateral cavity 438, the exhaust hole in the unscrewing sense 437, the first exhaust hole 53, the second hollow interior space $50_2$, the second exhaust hole 54, the exhaust hole 433, the inlet $221_1$ and then the outlet $221_2$ of the exhaust channel 221.

The device comprises a setting element for setting the air intake section of the motor 4.

The setting element comprises a setting sliding gate 7.

The sliding gate 7 comprises a cylindrical element 70 notched with a notch 703 delimited by a first extremity 700 provided with an end wall 707 and a second extremity 701 leaving a peripheral wall 706 called a shutter wall.

The first extremity 700 is intended to get housed within the selector 5 at the level of the first intake hole 51 and a second intake hole 52 to demarcate, with the wall 707, interior spaces $50_1$, $50_2$. This first extremity 700 shuts off the hollow interior space 50 of the selector on either side, in a tightly sealed and rotationally mobile way, by an H7g6 type adjustment of the sliding gate in the selector 5.

The peripheral wall 706 between the extremities 700 and 701 is traversed by a adjustable-window aperture 702 that stretches along a longitudinal axis of the sliding gate 7 and has its width increasing in a direction going from the second extremity 701 to the first extremity 700. This aperture 702 has an essentially triangular form and leads into the notch 703.

The second extremity 701 has a longitudinal recessed feature 704 and a peripheral groove 705.

The setting element comprises a selector for selecting at least two states, namely:
- a predetermined air passage state called a fixed state in which the intake section of the motor 4 can be chosen according to at least one aperture of predetermined section (two apertures of different predetermined sections in the present case);
- an air passage state, called an adjustable state, in which the intake section of the motor 4 is adjustable over a predetermined range of sections.

In the present embodiment, the device has a state called a fixed state with total intake section, a state called a half-fixed state with an intake section equal to 50% of the total maximum intake section, and a state called a setting state in which it is possible to make the intake section vary from 5% to 45% of the total intake section.

The selector comprises a lever 8 having a finger 80 housed within the recessed feature 704 of the sliding gate 7 and a grasping zone 81. The set formed by the group 704 and the finger 80 forms a sliding link along the axis B. Thus, the lever 8 and the sliding gate 7 are rotationally linked along the axis B but are mobile in translation relative to one another along the axis B. The lever 8 is mounted so as to be mobile in rotation along the axis B to rotationally drive the sliding gate 7 within the selector 5. The sliding gate 7 can herein take three positions, namely:
- a position called a fixed total intake position enabling the device to be placed in its state of total intake;
- a position known as half-intake position enabling the device to be placed in its half-intake state;
- a position called an adjustable intake position enabling the device to be placed in its setting state.

The setting element furthermore comprise an adjuster for adjusting the intake selection of the motor 4. The adjuster includes an adjusting or setting knob wheel 9.

The adjusting knob 9 wheel is mounted so as to be rotationally mobile about an axis essentially parallel to the axis B and to the rotation axis of the terminal element 1.

This adjusting knob 9 wheel is rotationally linked to a pinion gear 90 that engages with a toothed wheel portion 100 made on the periphery of a setting ring 10. The setting ring 10 is mounted so as to be rotationally mobile and fixed in translation relative to the lid 11, about an axis A that is essentially parallel to the axis B and to the rotation axis of the terminal element 1, on a bearing 111 made on the rear lid 11 that closes the motor 4.

This setting ring 10 has a cam 101 on its periphery that stretches helically along the rotation axis A.

The cam 101 co-operates with the groove 705 of the sliding gate 7 so much so that the setting ring 10 and the sliding gate 7 are linked by a helical link. This helical link enables the rotational motion of the knob wheel 9, and therefore of the setting ring 10 along the axis B, to be converted into a motion of translation of the sliding gate 7 within the selector 5 along the axis B in one sense or in another along the sense of rotation of the knob 9.

The setting ring 10 has a graduation 102.

The housing 1 is enclosed in the rear by a hood 23 crossed by a window 231 enabling the operator to know the position of the setting ring 10 in reading, through this window, the visible value of the graduation 102 corresponding to the value of the intake section called an intake section adjustable in terms of percentage of the maximum intake section. The hood 23 carries a second graduation 232 with three indicators 233, 234, 235 enabling the locating of the three positions of the lever 8, namely respectively the position known as an adjustable position and the two positions known as fixed positions.

The selector 5 and the adjusting sliding gate 7 respectively carry firstly intake holes 51, 52 and secondly the triangular aperture 702 and the notch 703 which are laid out in such a way that:
- when the selector 5 is in a screwing position,
  - and when the adjusting sliding gate 7 is in the total intake position (position 3, FIG. 9): the intake holes 51 and 52 are situated in the extension of the notch 703 so much so that they are totally open; the position of the knob wheel 9 has no effect on the intake section which is the maximum (Sadm=$Sadm_{max}$);
  - and when the adjusting sliding gate 7 is in the half-intake position (position 2, FIG. 9): the intake hole 51 is situated in the extension of the notch 703 while the intake hole 52 is shut at 50% by the shutter wall 706 of the sliding gate 7, only 50% of its section being situated in the extension of the notch 703 so much so that the hole 51 is totally open but the hole 52 is half open; the position of the knob wheel 9 has no effect on the intake section which is equal to 50% of the maximum
  - and when the sliding gate 7 is in the position called the adjustable intake position (position 1, FIG. 9): the intake hole 51 is situated in the extension of the notch 703 so much so that it is totally open, while the intake hole 52 is partially shut by the wall 706 and partially opened by the aperture 702, so much so that its section varies between 5% and 45% of its maximum total section along the longitudinal position dictated on the sliding gate 7 along the axis B, depending on the angular position of the knob wheel 9 chosen by the operator ($0.05 \cdot Sadm_{max} < Sadm < 0.45 \cdot Sadm_{max}$);
- when the selector 5 is in the unscrewing position, the intake holes 51 and 52 are systematically situated in the extension of the notch 703 whatever the positions of the adjusting sliding gate 7 resulting on the one hand from the knob 9 and on the other hand from the lever 8.

Thus, the air passage section in the unscrewing configuration is 100% of the maximum total section.

The operator can choose:
the screwing-unscrewing sense by means of the actuating button 6 which acts on the angular position of the selector 5;
the intake section of the motor and therefore the screwing power, by acting, when the screwing section is selected:
on the one hand on the lever 8 to choose the total intake state to have a maximum intake section, the half-intake state to have an intake section corresponding to half of the maximum intake section, the adjustable intake state in which it can obtain variation in the intake section between 5% and 45% of the maximum intake section
secondly on the knob wheel 9 to obtain variation between 5% and 45% of the maximum intake section after having selected the adjustable intake state by means of the lever 8.

It is thus possible to obtain variation in the air intake section in the motor, and therefore in the flow rate of air circulating in the motor and its rotation speed. This makes it possible to set the level of tightening torque applied for a given impact time and given air pressure.

The passage from a dedicated setting state at a given application to a state called a fixed state, without disturbance of the intake section of the setting state momentarily enables the modification of the tightening power of the device to obtain an unspecified tightening value then to return to the setting state without having to carry out a new setting to make a tightening according to the particular application.

The knob wheel 9 herein has nine indexed positions while the lever 8 has three indexed positions. To this end, the setting wheel 10 has indentations 103 in which there is housed an elastically deformable element fixedly attached to the lid 23.

When the unscrewing sense is selected, the intake section is systematically at 100% whatever the positions of the lever 8 and the knob wheel 9.

In this embodiment, two states known as fixed states and one state known as an adjustable state are selected. In one variant, only one or more than two states, known as fixed states, will be selected.

In this embodiment, the intake section in the states known as fixed states is 100% or 50% of the total intake section. These values given by way of examples could be different in variants. This can be applied equally well to total intake percentage values which can be chosen from in the mode known as adjustable mode.

The passage from one state to another is obtained by movement in rotation of the sliding gate while the setting of the intake section is obtained by a shifting in translation of the sliding gate. In one variant, these kinematics could be inverted to obtain the passage from one state to another by a movement in translation of the sliding gate and the setting of the intake section by a movement in rotation of the sliding gate.

An exemplary embodiment of the disclosure is aimed especially at providing an efficient solution to at least certain of the different problems of the prior art.

In particular, an exemplary embodiment provides a pneumatic screwing-unscrewing device for which the possibilities of setting the rate of air supply to the motor are optimized.

In particular, at least one embodiment provides a device such as this that improves productivity, for example in having its settings made in a simple and rapid way.

At least one embodiment provides a device such as this that offers the possibility of passing from a particular supply flow rate setting to a predetermined supply flow rate while maintaining the particular setting so that it is possible to subsequently return to this particular setting without another setting operation.

An exemplary embodiment provides a device that is robust and/or economical in its design.

Although the present disclosure has been described with reference to one or more examples, workers skilled in the art will recognize that changes may be made in form and detail without departing from the scope of the disclosure and/or the appended claims.

The invention claimed is:

1. A pneumatic tightening/untightening device comprising:
a terminal element configured to cooperate with an element to be tightened/untightened; and
a body housing:
a pneumatic motor capable of rotationally driving said terminal element;
an air intake into said motor;
a setting element, which sets an intake section of said air intake into said motor,
wherein setting element can take at least:
at least one a fixed state in which said intake section is fixed; and
at least one a setting state in which said intake section is adjustable between at least two values and
wherein said setting element comprises a setting sliding gate that is mobile;
along a first path to pass from one of said states to the other; and
along a second path to adjust the value of said intake section in said setting state; and
wherein said device comprise at least one air intake hole in said motor, said setting sliding gate being mounted so as to be mobile in rotation and in translation along an axis B and comprising an aperture that widens along the axis B and a notch with a constant section along the axis B, a shutter wall crossed by said aperture communicating with said notch, said setting sliding gate being capable of being moved in rotation to tale at least:
a first position to place said device in said at least one fixed state, in which the intake hole communicates directly with the notch:
partly in being partially shut by said shutter wall; or
totally, in being totally open on said notch
a second position to place said device in said at least one setting state, in which the intake hole communicates with the notch through the aperture;
partly in being partially shut by the shutter wall, and
adjustably, between at least two values, said setting sliding gate sliding gate being capable of being moved in translation along the axis B to take at least two positions in which said at least one intake hole is more or less shut by said shutter wall.

2. The device according to claim 1 wherein in each of said at least one fixed states, said intake section ranges from 30% to 100% of the maximum intake section.

3. The device according to claim 1 wherein said setting element is configured to choose the value of said intake section, in said at least one setting state, amongst a plurality of predetermined values.

4. The device according to claim 1 comprising means for selecting a sense of rotation of said terminal element, said setting element being configured so that the value of said intake section is maximum when the selected sense of rotation of said terminal element is an unscrewing sense.

5. The device according to claim 1 wherein said first path is a rotation and said second path is a translation.

6. The device according to claim 1 wherein said first path is a translation and said second path is a rotation.

7. The device according to claim 1 comprising a selector that is mobile between:
- a position of rotation of said terminal element in a screwing sense in which said at least one intake hole co-operates with a first cavity leading into a first side of axis of rotation of a rotor of the motor to drive the rotor in rotation in one sense;
- a position of rotation of said terminal element in an unscrewing sense in which said at least one intake hole cooperates with a second cavity leading into a second side of the rotation axis of the said rotor to lead the rotor in rotation in another sense;

said notch of said setting sliding gate being laid out in order to totally open said at least one intake hole, whatever the state in which said setting sliding gate is situated, when said selector is situated in said position of rotation in the unscrewing sense.

8. The device according to claim 1 comprising a setting knob wheel for setting the value of said intake section in said at least one setting state, said knob wheel being mobile in rotation and linked to said setting sliding gate by a helical link capable of converting a movement of rotation of said knob wheel into a movement of translation of said setting sliding gate along the axis B.

9. The device according to claim 8 wherein said knob wheel bears a pinion gear cooperating with a toothed wheel that is mobile in rotation along an axis A parallel to said axis B and fixedly attached to a cam extending helically way about said axis A, said cam cooperating with a groove made on the periphery of said setting sliding gate.

10. The device according to claim 8 wherein said knob wheel has a plurality of indexed positions, each corresponding to a predetermined intake section value.

11. The device according to claim 9 wherein said toothed wheel has a marking indicating the intake section values for each of the positions indexed.

12. The device according to claim 11 wherein said markings are visible through a window passing through a hood disposed in the rear of said tightening/untightening device.

13. The device according to claim 1 comprising a driving lever for driving said setting sliding gate in rotation along the axis B from one of its positions to the other, said lever being linked to said setting sliding gate by a sliding link according to axis B.

14. The device according to claim 7 wherein said setting sliding gate is mounted so as to be mobile in rotation and in translation within said selector.

15. The device according to claim 1 wherein:
- the at least one fixed state comprises a first fixed state with total intake in which said intake section is maximal;
- the at least one fixed state comprises a second fixed state with half intake in which said intake section represents 50% of the maximum intake section;
- the at least one setting state comprises a setting state configured to enable an incremental modification of said intake section between values ranging from 5% to 45% of the maximum intake section.

* * * * *